(12) United States Patent
Koenig et al.

(10) Patent No.: US 12,118,871 B2
(45) Date of Patent: Oct. 15, 2024

(54) SYSTEM AND METHOD FOR IDENTIFYING MISPLACED GOLF CLUBS

(71) Applicant: KSI LLC, San Francisco, CA (US)

(72) Inventors: Jesse Koenig, San Francisco, CA (US); Matthew Smiley, San Diego, CA (US); Guy McIlroy, Los Gatos, CA (US); Venkat Balakrishnan, San Jose, CA (US)

(73) Assignee: Koenig & Smiley Inventions LLC, Portland, OR (US)

( * ) Notice: Subject to any disclaimer, the term of this patent is extended or adjusted under 35 U.S.C. 154(b) by 13 days.

(21) Appl. No.: 17/881,744

(22) Filed: Aug. 5, 2022

(65) Prior Publication Data

US 2024/0046772 A1 Feb. 8, 2024

(51) Int. Cl.
*A63B 60/00* (2015.01)
*G01J 1/42* (2006.01)
*G08B 21/24* (2006.01)
*A63B 55/00* (2015.01)

(52) U.S. Cl.
CPC ............ *G08B 21/24* (2013.01); *A63B 60/00* (2015.10); *G01J 1/42* (2013.01); *A63B 2055/402* (2015.10)

(58) Field of Classification Search
CPC ...... G01J 1/42; A63B 2055/402; A63B 60/00; G08B 21/24
See application file for complete search history.

(56) References Cited

U.S. PATENT DOCUMENTS

| | | | |
|---|---|---|---|
| 4,042,918 A | 8/1977 | Klitzman | |
| 4,489,314 A | 12/1984 | Miller | |
| 5,565,845 A | 10/1996 | Hara | |
| 5,782,443 A | 7/1998 | La Fontaine | |
| 5,952,921 A | 9/1999 | Donnelly | |
| 6,057,762 A | 5/2000 | Dusza | |
| 6,118,376 A | 9/2000 | Regester | |
| 6,366,205 B1 | 4/2002 | Sutphen | |
| 6,377,175 B1 | 4/2002 | Williams | |
| 6,407,667 B1 | 6/2002 | Jackson | |
| 6,411,211 B1 | 6/2002 | Boley | |
| 6,774,792 B1 | 8/2004 | Williams | |
| 7,205,894 B1 | 4/2007 | Savage | |
| 7,605,705 B2 | 10/2009 | Kritt | |
| 8,142,304 B2 * | 3/2012 | Reeves | A63B 71/0622 473/192 |
| 8,581,727 B1 | 11/2013 | Koenig | |
| 2013/0144411 A1 * | 6/2013 | Savarese | A63B 55/00 700/91 |
| 2014/0277630 A1 * | 9/2014 | Meadows | G09B 19/0038 700/91 |

\* cited by examiner

*Primary Examiner* — Benyam Haile
(74) *Attorney, Agent, or Firm* — Merchant & Gould P.C.

(57) ABSTRACT

Disclosed herein are systems and methods for determining when one or more golf clubs are in use or in a golf bag. Alerts can be provided if it is determined that the golfer has misplaced one or more golf clubs. The disclosed systems and methods can also be used to determine whether other objects have been misplaced from a typical storage container.

20 Claims, 7 Drawing Sheets

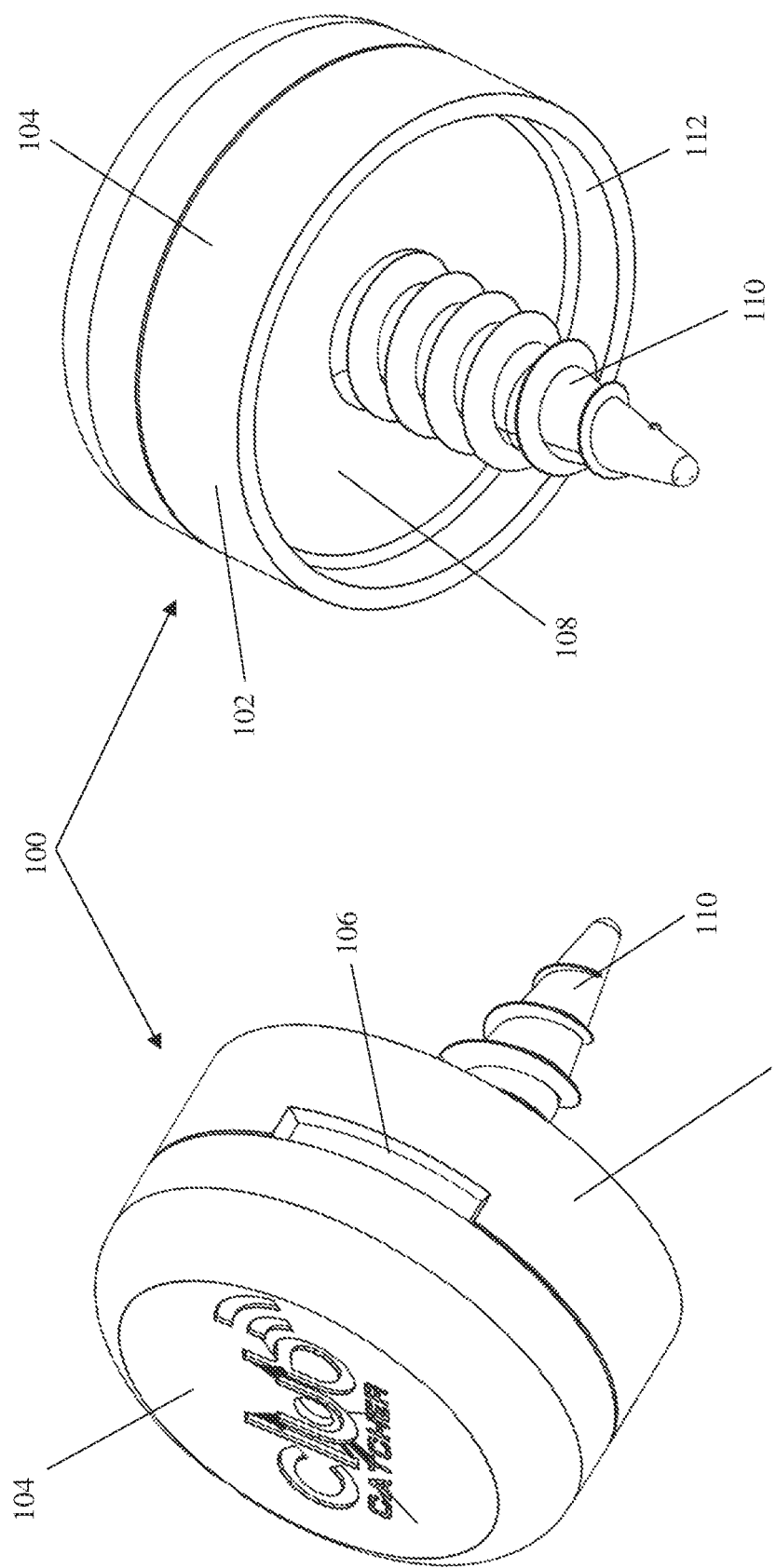

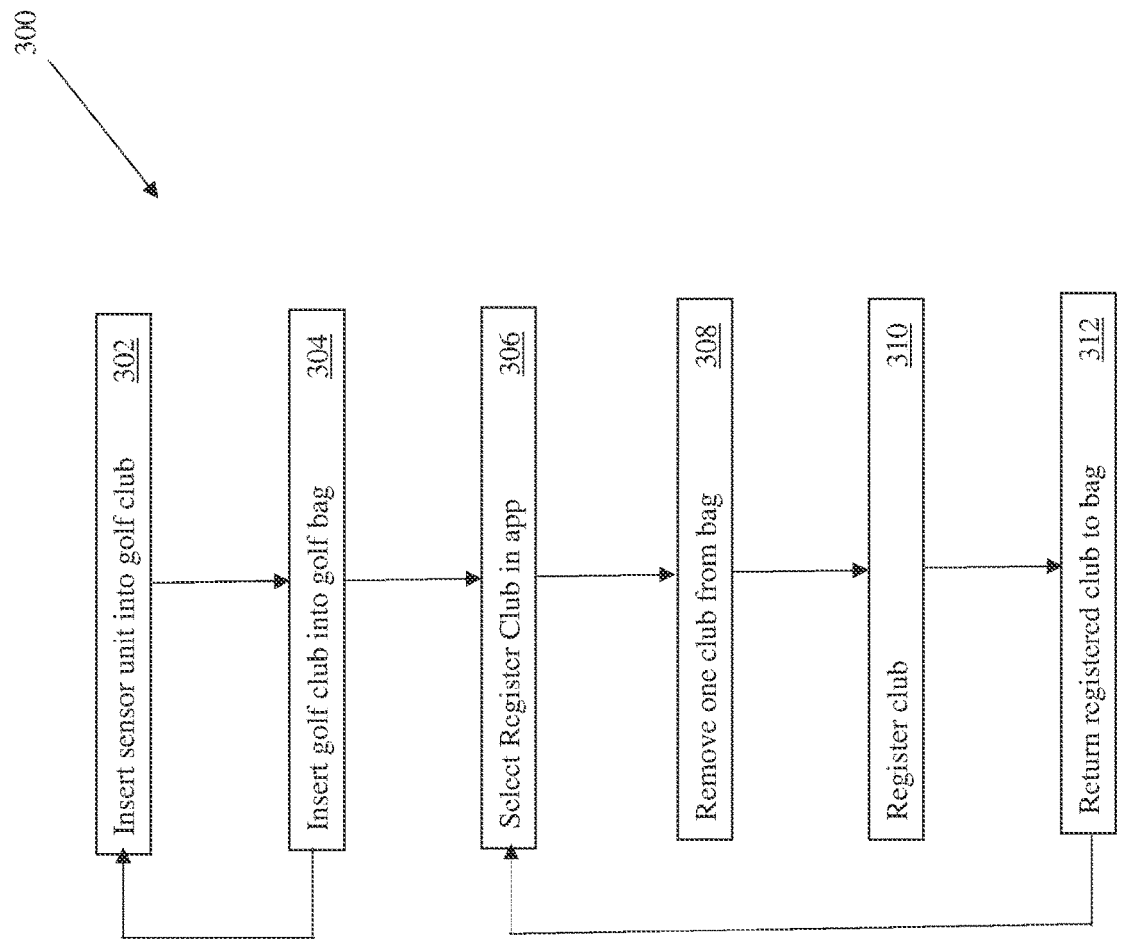

SYSTEM AND METHOD FOR IDENTIFYING MISPLACED GOLF CLUBS

TECHNICAL FIELD

The present disclosure relates to golf club alert systems and methods, and, more particularly, to identifying when a golf club is in use and/or has been misplaced and providing a corresponding alert.

BACKGROUND

There are several known approaches to solving the problem of misplaced golf clubs. However, shortcomings are apparent in each of the systems disclosed in the past. U.S. Pat. No. 6,366,205 describes a system comprising sensors associated with golf clubs and an interrogator operative to obtain an inventory of golf clubs present in a golf bag and a controller operative to detect the absence from an inventory of a club that was present in a previous inventory. The absent club is treated by this system as "missing", and the system responds by activating an alert. However, in the vast majority of cases in practice, the absent club would actually be in use by the golfer, not misplaced, creating a constant annoyance to the user as the alarm was activated each time a club was used as part of normal play.

U.S. Pat. Nos. 4,042,918, 4,489,314, 5,565,845, 6,377,175 and 6,774,792 require that an apparatus be fitted to the top of a golf bag or inside a golf bag, with individual holes or tubes, one for each golf club, each hole or tube containing an electromechanical switch or other sensor to detect the presence of a golf club. This apparatus would be bulky and require myriad versions to fit the myriad different shapes and sizes of golf bags, making such examples quite expensive and cumbersome to the user. Furthermore, it would be inconvenient for the golfer to be required to carefully place a golf club in a fitted hole or tube within the bag.

U.S. Pat. Nos. 4,042,918, 6,366,205, 6,411,211 and 7,605,705 include methods that do not detect when a club has been actually misplaced, nor activate an alarm appropriately, instead just activating an alarm whenever a club is removed from the bag, which could cause a constant annoyance to the user as clubs are removed during normal play.

U.S. Pat. Nos. 5,952,921, 6,057,762 and 6,118,376 comprise devices attached to golf clubs wherein the devices transmit, reflect, or in some way emit radio-frequency (RF) signals, and further comprise an RF receiver attached to the golf bag, with an alarm that is activated if an emitting device is beyond a certain threshold distance from the receiver. This method implies that the emitting device must be in RF contact with the receiver during all normal play and should be out of RF contact only in the case of a lost or misplaced place. Clubs may be more than 100 yards away from the receiver during normal play (whether the receiver is attached to the golf bag or carried by the golfer). Therefore, the emitting device must be able to transmit a signal continuously to the receiver over distances greater than 100 yards. This is problematic because it requires a relatively high-power emitting device, and thus the device is relatively expensive and requires relatively large batteries, which would have relatively short life. Also, additional problems could arise if there were any trees, buildings, hills, or other obstacles between the club and the receiver as would often occur during normal play, in which case the RF link would be broken and the alarm would activate, erroneously indicating a misplaced club.

U.S. Pat. No. 5,782,443 is a mechanical device meant to enable a golfer to put down a golf club in such a way that it is held vertically so that it will be easily visible and thus will supposedly not be lost or misplaced. Such devices are cumbersome for the golfer to carry and disrupt normal play to some degree. Also, the golfer must remember to carry the device whenever he will have occasion to place a club down on the ground, which largely defeats the purpose of a lost club prevention system—to alleviate problems caused by forgetfulness.

U.S. Pat. No. 6,407,667 includes an RF transmitter not attached to a golf club, but contained in a separate device upon which a golf club is meant to be rested when it is placed down on the ground. It communicates via RF with a receiver that is meant to be carried on the golfer's person, and an alarm is activated if the distance between the receiver and transmitter exceeds a certain threshold distance. This type of system is cumbersome because it requires the golfer to carry extra devices; it is disruptive to the normal style of play; and since it requires the golfer to remember to use the device whenever he places a club down on the ground, it largely defeats the purpose of a lost club prevention system—to alleviate problems caused by forgetfulness.

U.S. Pat. No. 7,205,894 requires that a belt or some other apparatus be wrapped around the golf bag. This will be undesirable to the golfer because such an apparatus will be unsightly and will likely impede access to and desired use of the pockets, handles, and carrying straps of the golf bag.

U.S. Pat. No. 8,581,727 discloses a misplaced golf club alert system.

All references cited herein are incorporated herein by reference in their entireties.

SUMMARY

Disclosed herein are systems and methods for determining when one or more golf clubs are in use or in the golfer's bag. Alerts can be provided if it is determined that the golfer has misplaced one or more golf clubs.

In an embodiment, a golf club sensor unit can include a housing including an internal cavity, a fastener extending from the housing to attach the housing to a golf club, a photoelectric device acting as a light sensor disposed in the housing and configured to measure light intensity incident upon the housing, a 3-axis accelerometer acting as an angle sensor disposed in the housing and a processor disposed in the housing. The processor can determine that the light sensor has measured light intensity greater than a threshold value and that the golf club to which the housing is attached has been removed from a golf bag based on the light intensity being greater than that threshold value. The processor can further determine that the light intensity measured by the light sensor has fallen below the threshold value after determining that the golf club has been removed from the golf bag and then determine the golf club's angle with respect to earth's gravity vector, with the angle sensor. The processor can then determine that the golf club has been returned to the bag if the angle of the golf club is within a range of values corresponding to the typical range of orientations of a golf club within a golf bag when the golf bag is being carried by a person, carried on a golf cart, or stood on the ground.

In an embodiment, a system for determining when golf clubs are in use can include a golf club sensor unit and a software application in wireless communication with the golf club sensor unit. The golf club sensor unit can include a housing including an internal cavity, a fastener extending from the housing to attach the housing to a golf club, a light sensor disposed in the housing and configured to detect light exterior of the housing, an angle sensor disposed in the housing and a processor disposed in the housing. The processor can determine that the light sensor has measured a light intensity greater than a threshold value and that the golf club to which the housing is attached has been removed from a golf bag based on the light intensity being greater than that threshold value. The processor can then communicate an indication that the golf club is out of the bag to the software application. The processor can further determine that the light intensity measured by the light sensor has fallen below the threshold value after determining that the golf club has been removed from the golf bag and then determine the angle of the golf club with the angle sensor. The processor can then determine that the golf club has been returned to the bag if the angle of the golf club is in a range of angles corresponding to an orientation of a golf club within a golf bag. The processor can then communicate an indication that the golf club has been returned to the bag to the software application.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIGS. 1A-1C depict various views of a golf club sensor unit according to the disclosure.

FIG. 3 depicts a flowchart of method steps for registering golf club sensor units with a software application according to the disclosure.

Figure 1C:
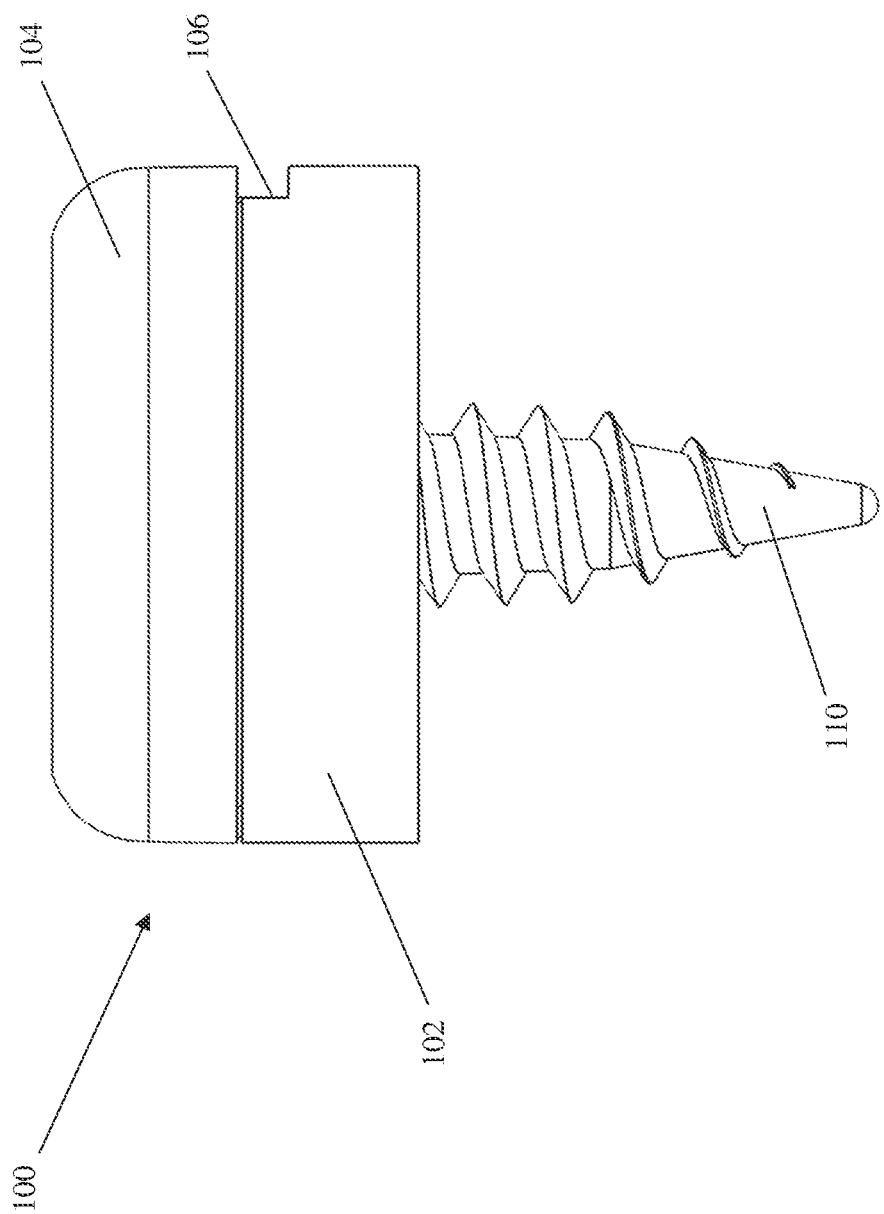

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

During a game of golf, a golfer will often remove more than one club from the golfer's golf bag, especially when the golfer's golf ball is close to the putting green. The clubs removed often include one or more wedges used for short shots around the green, as well as a putter used for putting on the green. After the golfer uses the wedge to hit the ball onto the green, the wedge club is often placed on the ground while the golfer uses the putter on the green. Sometimes, after putting the golfer forgets to retrieve the wedge that was left on the ground. Similarly, a golfer may take more than one club over to the golfer's ball because the golfer wishes to view the shot the golfer needs to hit from the location of the golf ball prior to deciding which club to hit. The golfer must then necessarily set down any club the golfer brought over to the ball that is not going to be used to hit the shot, and such clubs can also be inadvertently left behind. Such missing club(s) can go unnoticed for several holes, causing significant inconvenience, or can be lost entirely, causing both inconvenience and undesired monetary expenditure. In the context herein, it should be understood that a misplaced golf club is a golf club that has been lost, accidentally left behind, forgotten, or otherwise not returned to the golf bag due to circumstances other than the use of the golf club as part of normal golf play.

FIGS. 1A-1C depict a golf club sensor unit 100 according to an embodiment of the disclosure. Golf club sensor unit 100 can include a housing comprising a sensor unit body 102 and a cap 104. Sensor unit body 102 can include a slot 106 defined therein that enables a user to remove the cap 104 to, for example, replace a battery contained within sensor unit body 102. Sensor unit body 102 can include a recessed bottom surface 108 from which a fastener 110 for attaching the golf club sensor 100 to a golf club extends. In the depicted embodiment, the fastener 110 is a screw having screw threads that can be rotatably attached to the golf club, but other fastener types are contemplated. A flange 112 extends downwardly around sensor unit body 102 from recessed bottom surface 108 to aid in the outer edge of housing being flush with the convex top of a golf club grip. Cap 104 can at least partially comprise a translucent material to enable the light sensor to detect light incident upon the cap 104.

Figure 2:
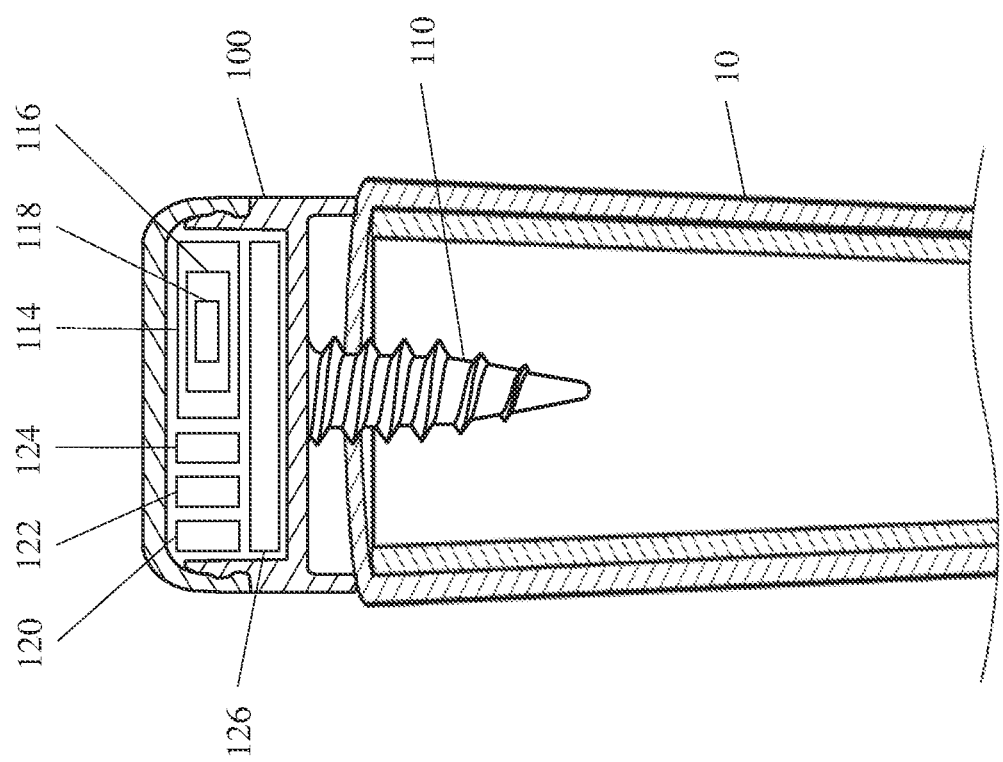
FIG. 2 depicts a cross-sectional view of a golf club sensor unit installed onto a golf club according to the disclosure.

FIG. 2 depicts a cross-sectional view of an exemplary golf club sensor unit 100 attached to a golf club 10. In practice, a system as described herein will generally include at least two golf club sensor units 100 associated with two different clubs (e.g., a putter and a wedge) and in some embodiments include a golf club sensor unit 100 for every club in a player's bag. In other embodiments, only a single sensor and club unit are required. The electrical components of golf club sensor 100 can be contained within the cavity formed between the sensor unit body 102 and the cap 104, as shown schematically in FIG. 2. The golf club sensor unit 100 can include a processing segment 114 that can include a processor 116 that controls operations of sensor unit 100 and a memory 118. Processing segment 114 can process incoming and outgoing signals using an RF transceiver 120 and an antenna. Processing segment 114 may store various information in the memory 118 and may be communicatively linked to the light sensor 122 and to the angle sensor 124. For example, in embodiments a unique identifier code is associated with each golf club sensor unit 100 and stored in the memory 118 with no two sensor units 100 in the same system having the same code. A battery 126 or other electrical power source can provide power to the sensor unit 100. In some embodiments, battery 126 is a coin cell battery, e.g., a CR2032 coin cell battery that can, as noted above, be replaced as needed by removing cap 104.

Initially, each golf club sensor unit 100 must be registered with the system and paired with a specific golf club. For example, the system may include a software application configured to operate on a user's device such as a smartphone that guides a user through registering each golf club sensor unit 100. The software application may be configured to operate on other devices such as a smartwatch, a golf GPS watch, another kind of golf GPS device, another kind of range-finding device such as a laser rangefinder, and a dedicated device to run the software application. FIG. 3 depicts a flowchart of method steps 300 for registering golf club sensor units 100 with such a software application. At step 302 a golf club sensor unit is installed onto a golf club and then at step 304 the sensor unit is placed into the user's golf bag. In embodiments, this step should be repeated until each and every sensor unit the user will be employing has been inserted onto a corresponding golf club. The user can then select a Register Club icon or other element in the software application that activates the club registration feature of the application at step 306. The user then at step 308 removes one club having a sensor unit attached from the bag. The removed sensor unit will then appear in the software application as, for example, "unregistered" and "OUT" (i.e. out of the bag) when the light sensor in the sensor unit detects (via translucent cap material) light intensity greater than a threshold value to indicate that the club has been removed from the bag. At step 310, the user can register the club in the software application, for example, by entering "putter," wedge," etc. into the software application and return the registered club to the bag at step 312. This process can then be repeated for each of the user's golf club's that has a corresponding sensor unit. Once all of the golf club sensor units have been registered, the registration process is complete.

Each golf club sensor unit 100 can cooperate with the software application to determine when a club is put into use and when a club is returned to the bag through use of the unit's light sensor and/or angle sensor. When a club and sensor unit are in a user's bag, the sensor unit 100 can be in a low-power sleep state in which only a circuit for detecting light with the light sensor is kept active in order to extend the battery life of the sensor unit. If light is detected by the light sensor, i.e., an intensity of light above a predetermined threshold, the sensor unit 100 can be activated and it can be determined that the club is out of the bag. Thus, in some embodiments, only the light sensor is employed to determine when a club has been taken out of the bag and the angle sensor does not factor into that determination. The sensor unit 100 can then transmit a signal to the software application via, for example, Bluetooth Low Energy, that the corresponding club is OUT of the bag. With regard to when a club is returned to the bag, the light sensor can be blocked by the user's hand, the ground if the club is put down, etc., so the mere fact that the light sensor may no longer be detecting light above the threshold will not accurately determine that a club has been returned to the bag. As such, the angle sensor of the sensor unit 100 is employed whenever the sensor no longer detects light above the threshold. If the angle sensor detects that the club is in a range of angles that generally indicate that the club is upside down (i.e., club handle towards the ground as a club would be positioned in a golf bag), then it is determined that the club has been returned to the bag and the sensor unit 100 can transmit a corresponding signal to the software application that the club is IN the bag. If the angle sensor detects that the club is not in the predefined "in the bag" range of angles, the club continues to indicate that it is OUT of the bag.

Figure 4C:
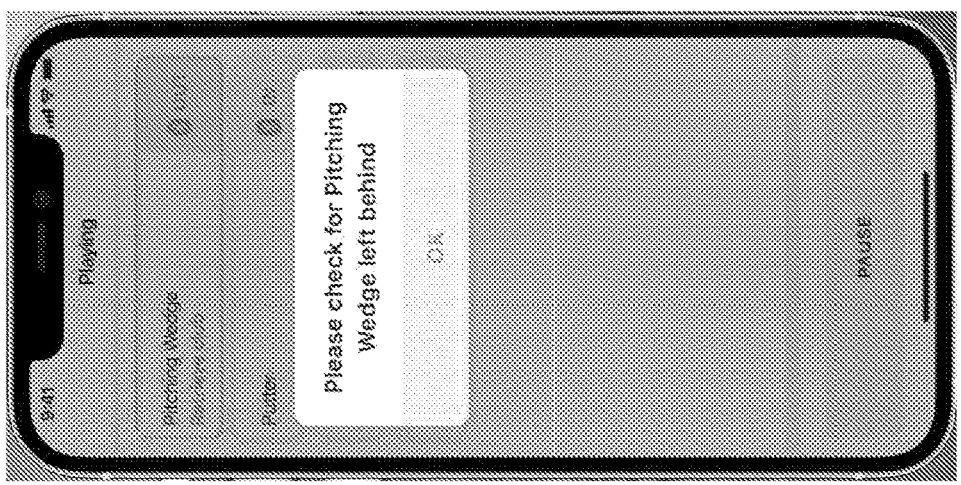
FIGS. 4A-4C depict exemplary screen shots of a software application according to the disclosure.
Figure 4B:
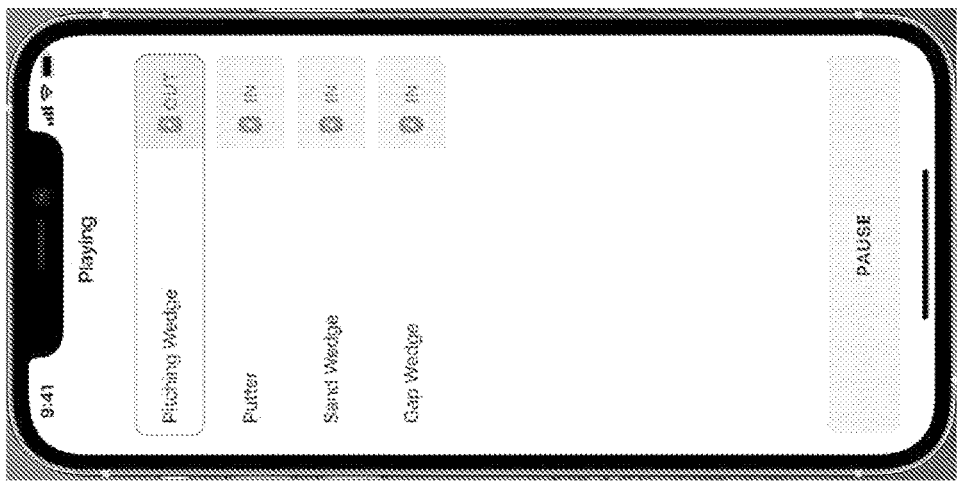
Figure 4A:
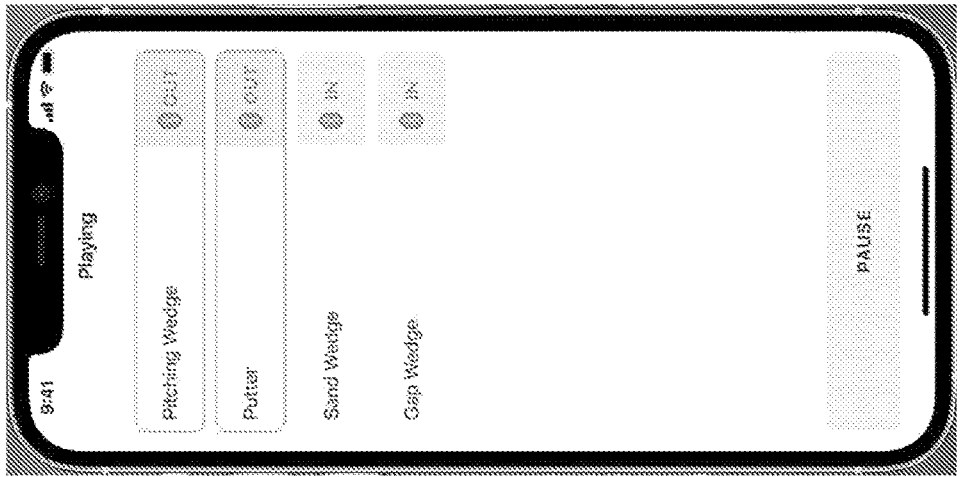

FIGS. 4A-4C depict exemplary screen shots of a software application configured to determine if a golf club is in or out of a golf bag and/or misplaced according to the disclosure. FIG. 4A depicts a club screen listing each club that is registered with the software. On the depicted screen, the putter and pitching wedge have been determined to be "Out" of the bag and the sand wedge and gap wedge are still "In" the bag. FIG. 4B depicts that the putter has been detected as having been returned to the bag so the putter is now identified as "In," which would begin the Return Timer for the pitching wedge. If the Return Timer expires without the pitching wedge being returned, a misplaced club notification can be provided stating, for example, "Please check for Pitching Wedge left behind" as depicted in FIG. 4C.

Figure 5:
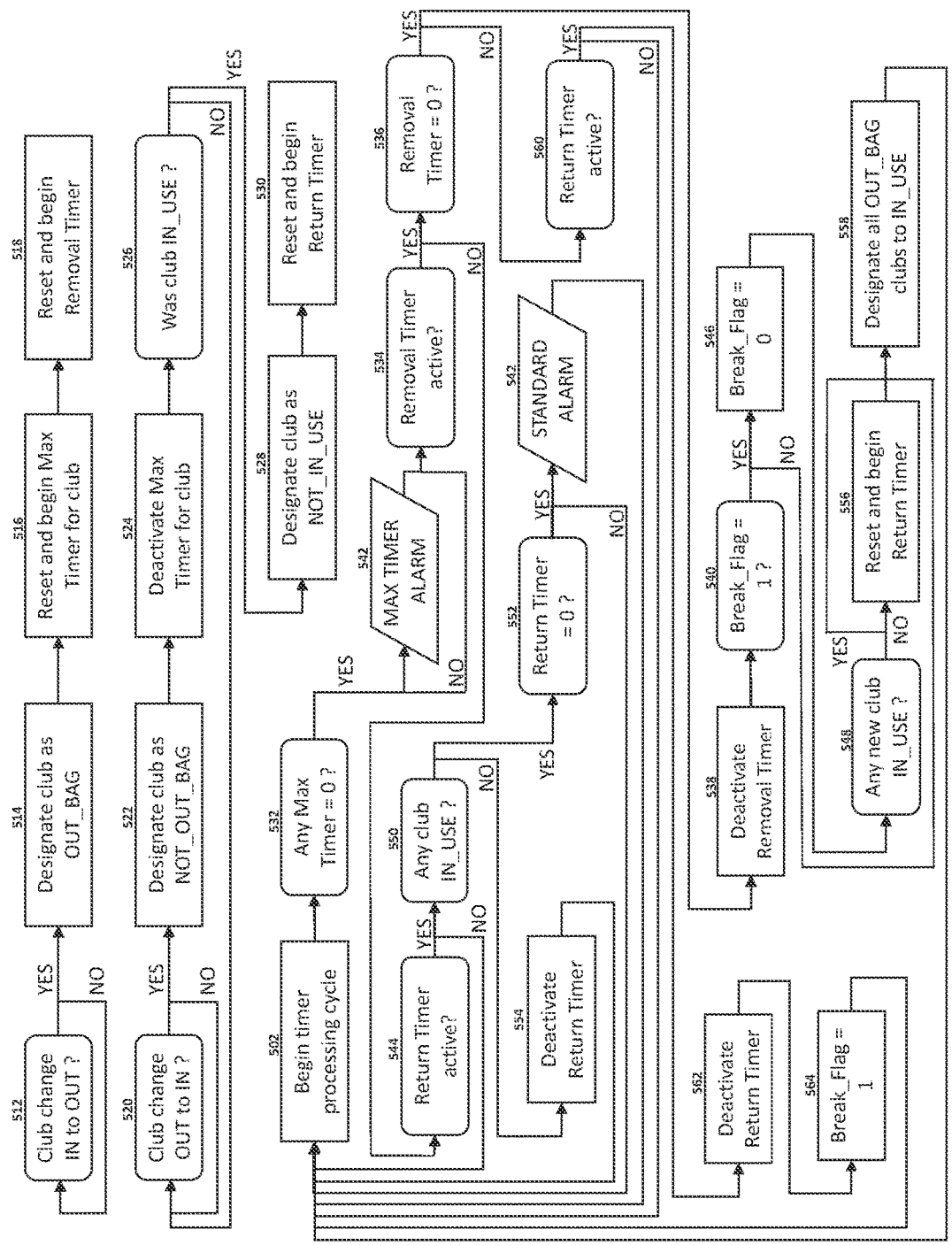
FIG. 5 depicts a flowchart of steps in a method of determining if a golf club is use and/or misplaced according to the disclosure.

A more detailed explanation of the methodology of determining misplaced golf clubs according to the present disclosure can be described with respect to FIG. 5. As noted above each sensor unit is capable of determining whether the corresponding club has been removed from the bag. If a sensor unit makes that determination at step 512, the sensor unit can communicate the change in status to the software application that can then register the club as out of the bag ("OUT_BAG") at step 514. Once one or more clubs are registered as OUT_BAG, a Max Timer for each club is set to its full duration and begins counting down at step 516. The Max timer can have a duration longer than any given club would typically be out of the golf bag during normal play, such as, for example, 15 minutes, and provides a backup measure of determining if a club has not been returned to the bag if one of the other methods described herein does not determine it. A Removal Timer of a shorter duration, such as, for example, 20 seconds is also activated and begins counting down at step 518 once a club is deemed OUT_BAG. If the Removal Timer expires without the club being returned to the bag, the club will be deemed IN_USE. This timer is intended to represent a period of time wherein a golfer is selecting which club(s) to use, such that the return of any OUT_BAG clubs during this timer does not cause an alarm, as in that case it is assumed the club(s) were returned in the process of club selection, not because the golfer has finished using the clubs he had removed.

Steps 520-530 in FIG. 5 depict the procedure for when a club is determined to have been returned to the golf bag. If a club has been determined to have been returned to the bag at step 520, that club is designated as NOT_OUT_BAG by the software application at step 522 and the Max Timer for that club is deactivated at step 524. It is then determined at step 526 if the club was IN USE (i.e., the Removal Timer had expired while the club was out of the bag). If the club was not in use, no further steps are taken with respect to that club because the club was returned to the bag soon after removal and therefore did not trigger the procedure for determining whether any clubs had been misplaced. If the club was IN_USE at step 526, the club is now designated NOT_IN_USE at step 528 and a Return Timer begins counting down at step 530. The Return Timer may be a relatively short, i.e., 10 second, timer providing a period of time after returning an IN_USE club, within which if there are other clubs IN_USE that are not returned, there will be an alarm; as a golfer will normally return clubs to the bag together in quick succession to each other when finished using them. The Return Timer duration is meant to be enough time for a typical golfer to return all clubs, yet short enough for the alarm relating to misplaced club(s) to occur before the golfer has departed the hole where club(s) were left behind.

The timer processing cycle that is carried out begins at step 502 in FIG. 4. Initially it is determined whether the Max Timer has expired for any club at step 532 and, if so, the Max Timer Alarm indicating a club has been misplaced is issued at step 542. If not, the system determines if the Removal Timer is active at step 534. If the Removal Timer is active, it is determined if the Removal time is zero (i.e., the timer has just expired) at step 536 and, if not, the method proceeds to step 560 to determine if the Return Timer is active. If the Return Timer is active, the Return Timer is deactivated at step 562, and then a variable known as Break_Flag, which will be described in more detail below, is set to 1 at step 564 and the method is complete until the next timer processing cycle. If the Return Timer is not active at step 560, the method is complete until the next processing cycle.

If at step 534 it is determined that the Removal Timer is not active, it is determined at step 544 whether the Return Timer is active. If not, the method is complete until the next processing cycle. If the Return Timer is active at step 544, it is determined at step 550 whether any club(s) have been deemed IN_USE. If not, the Return Timer is deactivated at step 554 and the method is complete until the next processing cycle. If a club is IN_USE at step 550, it is determined at step 552 whether the Return Timer is equal to zero (i.e. has expired). If the Return Timer has expired, the so-called Standard Alarm is issued to indicate that one or more IN_USE clubs have been misplaced, as those club(s) were not returned soon enough after another IN_USE club was returned. If at step 552 the Return Timer is not equal to zero, the method is complete until the start of the next processing cycle.

With regard to the Break_Flag variable, it should be noted: The Removal Timer always deactivates the Return Timer. Whenever a club is returned, the Return Timer is activated, but is immediately deactivated if either there are no other clubs IN_USE (i.e., no other clubs to be returned) or if the Removal Timer is already active (i.e., a club has recently been removed). Alternatively, if the Return Timer is already counting down and the Removal Timer starts due to a club being removed, the Return Timer is also deactivated. The variable Break_Flag is used to keep track of whether a currently active instance of the Removal Timer has deactivated (i.e., broken) the Return Timer (regardless of which one started first); if so Break Flag is set to 1.

Returning to FIG. 5, if at step 536 it is determined that the Removal Timer equals zero, i.e. it was active and has now expired, then at step 538 the Removal Timer is deactivated. From this point the method will eventually arrive at step 558, wherein all OUT_BAG clubs are designated as IN_USE, so this always occurs after the Removal timer counts all the way down to 0. However in between steps 538 and 558, Break Flag is assessed to determine whether the Return timer should be reactivated. At step 540 it is determined whether Break_Flag is equal to 1, i.e., whether the Removal Timer had deactivated the Return Timer. If so, then Break_Flag is set to 0 at step 546, and at step 548 if any new clubs have been designated IN_USE since just prior to the Removal Timer expiring, the method goes to step 558 to designate all OUT_BAG clubs to IN_USE, without reactivating the Return Timer. In this case apparently the golfer selected one or more new clubs to use near the time when he returned one or more clubs, i.e. he did not return club(s) because he was finished using all the clubs, so the Return Timer should not at this point be reactivated to potentially give an alarm if all clubs aren't returned prior to its expiration. If instead at step 548 no new clubs have been designated IN_USE since just prior to the Removal Timer expiring, then at step 556 the Return Timer is reset (i.e. reactivated) and begins counting down. In this case apparently the golfer returned an IN_USE club and also for some reason removed one or more clubs and then quickly returned those same club(s), but did not select any new clubs to use, indicating that he is likely finished using all the clubs, so the Return Timer should be reactivated such that if all clubs aren't returned prior to its expiration an alarm occurs. If Break Flag is not equal to 1 at step 540 (i.e., equals 0 because the current Removal Timer instance did not deactivate the Return Timer), then all OUT_BAG clubs are designated as IN_USE at step 558. If Break_Flag is equal to 1 at step 540 and is set to 0 at step 546, next at step 548 if any new clubs have been designated IN_USE since just prior to the Removal Timer expiring, the method goes to step 558 to designate all OUT_BAG clubs as IN_USE. If there are not any new clubs IN_USE at step 548, the Return Timer is reset and begins counting down at step 556 because as no new club has been selected, the golfer has apparently finished using the clubs so the Return Timer is activated to provide an alarm in case any other IN_USE clubs are not returned. Next, all OUT_BAG clubs are designated as IN_USE at step 558, which completes the method until the next processing cycle.

For example, if two clubs have been designated IN_USE and the golfer returns one to the bag and takes another one out, the Return Timer will start, but will be deactivated by the Removal Timer. When the Removal Timer expires, Break Flag would be equal to 1 and there is a new club IN_USE so the Return Timer is not started, on the assumption that the golfer has chosen a new club and is still golfing with that club. On the other hand, if the golfer has two clubs IN_USE, returns one club and takes another out (e.g. to show it to a friend, wipe dirt off of it, etc.) which starts the Removal Timer, and then the golfer returns that club while the Removal Timer is counting down, the Return Timer will be activated but then immediately deactivated by the active Removal Timer. Then when the Removal Timer expires, Break_Flag=1, and there is no new club IN_USE, so the Return Timer is started on the assumption that the golfer is finished using the clubs and should return all of them; if not, the system gives an alarm.

The system therefore alerts a golfer after a relatively short period of time such as 10 seconds after returning one or more but not all clubs, which would likely be before the golfer proceeds to the next hole of the golf course, that one or more golf clubs have been misplaced. The alert can be provided on one or more devices on which the software application is operating such as a smartphone. Alternatively or in addition the alert can be provided on other devices communicatively linked to a device on which the software application is operating, such as a smartwatch, headphones, etc.

Figure 6:
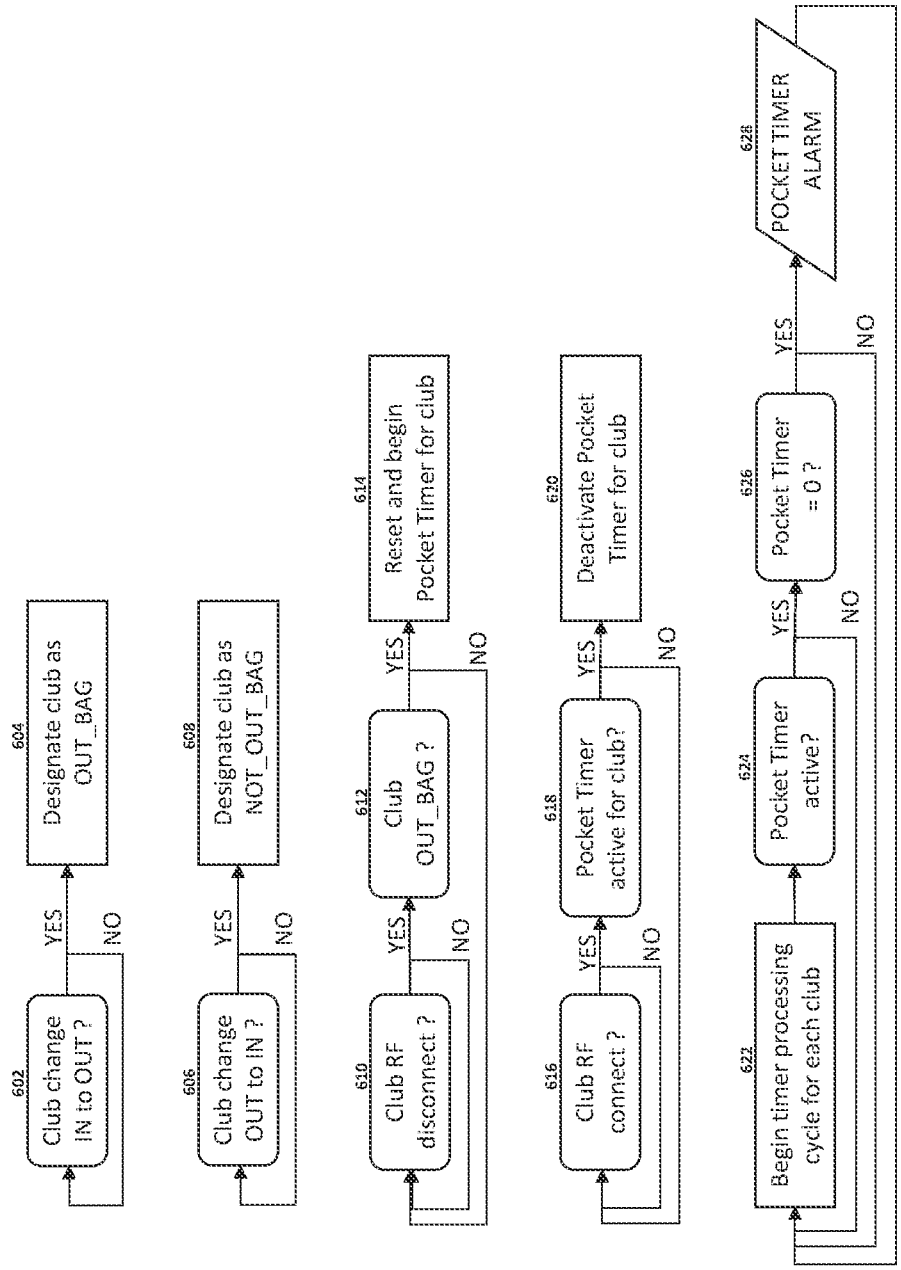
FIG. 6 depicts a flowchart of steps in a method of determining if a golf club is use and/or misplaced according to the disclosure.

The method for determining whether a club has been misplaced described above generally requires at least two clubs to be removed from the bag because return of one or more clubs without returning all clubs is used to determine that a club has been misplaced. In some embodiments, an additional mode (which can be referred to as "Pocket Mode") can be provided that can determine if a single club that is in use has been misplaced. A flow diagram of methods steps in such an embodiment is depicted in FIG. 6. Pocket Mode relies on the club proximity to the device on which the software application is operating and with which the sensors are synced, and therefore may generally require that the device, such as the user's smartphone, be on the user's person (i.e. in the user's pocket). Clubs can be determined to be IN or OUT with the light sensor and/or angle sensor as noted above at steps 602 and 606, respectively, and identified with a corresponding OUT_BAG or NOT_OUT_BAG designation. If the sensor unit for a club goes out of communication with the software application at step 610 and it is determined that the club is out of the bag in step 612, the Pocket Timer is activated. In some embodiments, the Pocket Timer is set for 10 seconds. If the sensor unit for the club returns into communication with the application at step 616, an active Pocket Timer at step 618 is deactivated at step 620. The processing cycle for each club begins at step 622. If there is an active Pocket Timer for a club at step 624, when that timer expires at step 626, meaning that the sensor has not been returned into communication with software before the timer expired, a Pocket Timer alarm indicating that the club may have been misplaced is issued at step 628.

While the disclosed systems, devices, and methods are described with respect to golf clubs, the systems, devices, and methods may be adapted to be used in various applications known in the art. It should be understood that it is within the broadest scope of the present disclosure to cover any systems that rely upon the devices and methods described herein to alert a user that any type of item has been misplaced from its normal storage place.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

The invention claimed is:

1. A sensor unit configured to be affixed to an object, the sensor unit comprising:
   a light sensor configured to measure light intensity;
   an angle sensor configured to measure angle relative to a reference vector; and
   a processor configured to:
      determine that if the light sensor measures light intensity greater than a threshold value, the object is out of a container; and
      determine that if the light sensor measures light intensity less than a threshold value and the angle sensor measures an angle within a particular range of values relative to the reference vector, the object is in the container, wherein the processor is configured to check the angle measured by the angle sensor only after determining that the light intensity measured by the light sensor is less than the threshold value.

2. The sensor unit of claim 1, wherein the processor is configured to determine that if the object has been determined to be out of the container, and subsequently the light intensity measured by the light sensor falls below the threshold value while the angle sensor measures an angle outside of a particular range of values relative to the reference vector, the object is still out of the container.

3. The sensor unit of claim 1, wherein:
   the object is configured to be affixed to a golf club;
   the container is a golf bag; and
   the reference vector is that of earth's gravity.

4. The sensor unit of claim 1, further comprising a wireless communication device, and wherein the processor is further configured to:
   communicate to another device an indication that the object is out of the container if the processor has determined that the object is out of the container; and
   communicate to the other device an indication that the object is in the container if the processor has determined that the object is in the container.

5. The sensor unit of claim 1, further comprising a housing including a translucent portion through which incident light may pass to the light sensor such that the light sensor can measure the intensity of the incident light.

6. The sensor unit of claim 1, further comprising a housing including a sensor unit body and a removable cap.

7. The sensor unit of claim 1, wherein the processor is further configured to maintain the unit in a low-power mode while the object is in the container.

8. The sensor unit of claim 1, wherein the processor is configured to determine without the use of the angle sensor that the object has been removed from the container.

9. A system for determining when golf clubs are in or out of a golf bag, comprising:
   a software application; and
   a sensor unit configured to be affixed to a golf club, the sensor unit comprising a light sensor configured to measure light intensity, an angle sensor configured to measure angle relative to a reference vector, a wireless communication device, and a processor configured to:
      determine that if the light sensor measures light intensity greater than a threshold value, the golf club is out of a golf bag, and communicate an indication that the golf club is out-of-the-golf-bag from the wireless communication device of the sensor unit to the software application;
      determine that if the light sensor measures light intensity less than a threshold value and the angle sensor measures an angle within a particular range of values relative to earth's gravity vector, the golf club is in the golf bag, and communicate an indication that the golf club is in-the-golf-bag from the wireless communication device of the sensor unit to the software application, wherein the processor is configured to check the angle measured by the angle sensor only after determining that the light intensity measured by the light sensor is less than the threshold value; and
   wherein the software application is configured to receive and record said indications.

10. The system of claim 9, further comprising a plurality of sensor units, each sensor unit configured to be affixed to a different golf club.

11. The system of claim 10, wherein the software application is further configured to store a specific golf club name for each of the different golf clubs, each name associated in the software application with the sensor unit affixed to that golf club.

12. The system of claim 11, wherein the software application is further configured to display an indication of whether each golf club is in-the-golf-bag or out-of-the-golf-bag.

13. The system of claim 10, wherein the software application is further configured to determine that if two or more golf clubs in a group are recorded as out-of-the-golf-bag, and subsequently that a first golf club from the group is recorded as in-the-golf-bag, and subsequently that one or more of a sub-group of the golf clubs from the group are recorded as still out-of-the-golf-bag after a particular period of time has passed since the first golf club was recorded as in-the-golf-bag as indicated by the expiration of a return timer that is initiated, or re-initiated if already active, when a golf club is recorded to have changed from out-of-the-golf-bag to in-the-golf-bag, then the one or more golf clubs in the sub-group have been misplaced.

14. The system of claim 10, wherein the software application is further configured to determine that if:
  a) two or more golf clubs in a group are recorded as in-use,
  b) subsequently that a first golf club from the group is recorded as in-the-golf-bag, and
  c) subsequently that one or more of a sub-group of the golf clubs from the group are recorded as still in-use after a particular period of time has passed since the first golf club was recorded as in-the-golf-bag as indicated by the expiration of a return timer that is initiated, or re-initiated if already active, when a golf club is recorded to have changed from in-use to in-the-golf-bag, then
  the one or more golf clubs in the sub-group have been misplaced,
  wherein a golf club
  a) is recorded as in-use when it remains out-of-the-golf-bag after a particular period of time has passed since it or any other golf club was most recently recorded to have changed from in-the-golf-bag to out-of-the-golf-bag as indicated by the expiration of a removal timer that is initiated, or re-initiated if already active: when a golf club is recorded to have changed from in-the-golf-bag to out-of-the-golf-bag, and
  b) is recorded as not-in-use when it is recorded as in-the-golf-bag.

15. The system of claim 14, wherein the software application is further configured such that an active instance of the removal timer will deactivate an active instance of the return timer or inhibit the initiation of the return timer,
  such that the one or more golf clubs in the sub-group will be determined to be misplaced if and only if the return timer was initiated by the change of the first golf club from in-use to in-the-bag after the removal timer had already expired for all the golf clubs in the group and then the return timer expires while the one or more golf clubs in the sub-group are still in-use.

16. The system of claim 9, wherein the software application is further configured to:
  determine that the wireless communication link between the sensor unit and the software application is not currently functional if the software application has not received communication from the sensor unit within a particular period of time, or if the communication link between the sensor unit and the software application is otherwise detected to have been disconnected; and
  determine that the golf club associated with the sensor unit has been misplaced if it was recorded as out-of-the-golf-bag and subsequently while it is still recorded as out-of-the-golf-bag, the wireless communication link between the sensor unit and the software application is determined to be not currently functional.

17. The system of claim 16, wherein the software application is further configured to:
  initiate a timer upon the communication link being determined to be not currently functional while the golf club is recorded as out-of-the-golf-bag; and
  determine that the golf club associated with the sensor unit is misplaced only if the communication link is not functional while the golf club is recorded as out-of-the-golf-bag for a particular period of time, as indicated by the expiration of the timer prior to the communication link functionality being reestablished.

18. The system of claim 13, wherein the software application is further configured to provide:
  any combination of audible, visible, and vibratory alerts indicating that one or more golf clubs were determined to have been misplaced; and
  any combination of audible, visible, and vibratory indications of which particular one or more golf clubs were determined to have been misplaced.

19. The system of claim 13, wherein the software application is further configured to transmit to a device other than the device on which the software application is operating, a signal to cause any combination of:
  audible, visible, and vibratory alerts indicating that one or more golf clubs were determined to have been misplaced; and
  audible, visible, and vibratory indications of which particular one or more golf clubs were determined to have been misplaced.

20. The system of claim 9, wherein the processor is configured to determine without the use of the angle sensor that the golf club has been removed from the golf bag.

* * * * *